United States Patent [19]
Naya

[11] 3,813,543
[45] May 28, 1974

[54] PATTERN DETECTING APPARATUS
[75] Inventor: Mikio Naya, Sakai, Japan
[73] Assignee: Minolta Camera Kabushiki Kaisha, Osaka, Japan
[22] Filed: Nov. 29, 1972
[21] Appl. No.: 310,508

[30] Foreign Application Priority Data
Dec. 23, 1971 Japan.................................. 46-2519

[52] U.S. Cl.................. 250/562, 356/168, 250/209, 250/223 R
[51] Int. Cl. ......................................... G01n 21/32
[58] Field of Search................... 356/168, 171, 237; 250/221, 222 R, 223 R, 222 PC, 562, 563, 572, 556, 557, 237 G; 209/111.7

[56] References Cited
UNITED STATES PATENTS
| | | | |
|---|---|---|---|
| 3,299,273 | 1/1967 | Sturdevant..................... | 356/168 X |
| 3,327,850 | 6/1967 | Simmons...................... | 209/111.7 X |
| 3,395,794 | 8/1968 | Petry........................... | 250/222 R X |
| 3,428,817 | 2/1969 | Hofmeister et al. ........ | 250/222 R X |
| 3,581,067 | 5/1971 | Willits......................... | 250/222 R X |

Primary Examiner—Walter Stolwein
Attorney, Agent, or Firm—Wolder & Gross

[57] ABSTRACT

An apparatus comprising an image-forming optical system for projecting reflected light from an article to be inspected and travelling on a conveyor onto an imaginary fixed plane to form an image thereon, a similar pattern resembling the pattern of portion of the article to be detected and permitting the passage of reflected light within the same area as the pattern of the portion to be detected, a photoelectric transducer disposed to receive the light passing through the pattern, an arithmetic circuit for calculating the difference between the electrical output level of the photoelectric transducer and an electrical level serving as a reference for judgement, position detecting means for detecting that the article has reached an inspecting position, and a logic circuit for generating an electrical instructing signal in response to a judging output signal from the arithmetic circuit and an article detecting signal from position detecting means.

13 Claims, 17 Drawing Figures

PATTERN DETECTING APPARATUS

BACKGROUND OF THE INVENTION

The present invention relates to a pattern detecting apparatus for optically detecting flaws, blemishes, irregular coating patterns, etc. in articles to be inspected.

Pattern detecting apparatuses are already known which include optical means for detecting, for example, flaws, blemishes and the like in paper prior to printing or for detecting whether the printed patterns are acceptable or not. Such apparatus includes a photoelectric transducer for continuously receiving light reflected from a width of surface of articles to be inspected which are travelling on a belt conveyor or the like, and the varying reflectivities sensed by the transducer are converted to electrical signals to check for the flaws, blemishes, irregular coating patterns and like defects. However, the rays of reflected light incident on the photoelectric transducer include rays reflected from the surface of the belt conveyor carrying the articles thereon, whereas the photoelectric transducer can not distinguish between the incident rays from the articles to be inspected and those from the belt conveyor.

When checking a great number of articles to be inspected for flaws, blemishes, irregular coating patterns, etc. to determine their acceptability, it is advantageous to produce a reject signal for the selection of defective articles, only upon detection of a defective article, if defective articles are fewer than acceptable articles, because the selector for this purpose will then be operated less frequently. Briefly, it is advantageous for the detecting apparatus to produce a detecting signal upon detecting either acceptability or unacceptability which is the less likely of the two cases.

If, for example, the articles to be inspected are such that the acceptable portion thereof has higher reflectivity than the defective portion and the conveyor belt for carrying the articles has higher reflectivity than the articles, the conventional apparatus may be adapted to produce a reject signal in a minimum output range of the photoelectric transducer.

However, if the acceptable portion has the lowest reflectivity and the defective portion has higher reflectivity, with the reflectivity of the belt exceeding the latter, the photoelectric transducer porduces a maximum output when receiving reflected light from the belt and a minimum output when receiving reflected light from the acceptable portion. For the distinction between acceptable articles and unacceptable articles, the output level serves as the indication of acceptable article if it is lower than a specified level and provides the judgment of unacceptable article if it is above the level, the detecting apparatus thus generating an electrical signal upon detecting the unacceptable article. However, if the output generated in response to the reflected light from the belt is maximum, the apparatus will produce a reject signal even while receiving the reflected light from the belt.

Conversely, if the acceptable portion has higher reflectivity than the defective portion and the belt has lower reflectivity than the unacceptable portion of the article, the drawback of producing a reject signal will likewise result while the photoelectric transducer is receiving reflected light from the belt.

With the conventional apparatus of the type described, therefore, the reflected light from the surface of conveyor for transporting the articles to be inspected is entirely neglected and the apparatus can not operate accurately in the foregoing cases.

SUMMARY OF THE INVENTION

An object of this invention is to provide a pattern detecting apparatus including a photoelectric transducer for receiving reflected light from articles to be inspected to detect flaws, blemishes, irregular patterns of coating or the like therein, the apparatus being capable of correctly distinguishing between reflected light from the articles and reflected light from the surface of a conveyor for carrying the articles thereon so as to reliably detect the factor to be checked.

Another object of this invention is to provide an apparatus of the type described which is capable of detecting flaws, blemishes, irregular patterns of coating or the like in the articles to be inspected and travelling on the conveyor at a high speed without any mischecking.

Another object of this invention is to provide an apparatus of the type described in which the output level of the photoelectric transducer for providing the indication of acceptability or unacceptability of the articles can be automatically adjusted in accordance with the variation in the brightness of a light source for illuminating the articles and conveyor.

Another object of this invention is to provide an apparatus including photoelectric transducers disposed respectively for a suitable number of divided segments of a pattern to be detected so as to detect with improved accuracy the pattern of the articles to be inspected.

The apparatus according to this invention comprises a conveyor for transporting articles to be inspected from one position to another, an image-forming optical system for projecting reflected light from the article to be inspected and travelling on the conveyor onto an imaginary fixed plane to form an image thereon, a similar pattern disposed in proximity to the image-forming plane and resembling the pattern of portion of the article to be detected, the similar pattern permitting the passage of reflected light within the same area as the pattern of the portion to be detected, a photoelectric transducer disposed to receive the light passing through the pattern, an arithmetic circuit for calculating the difference between the electrical output level of the photoelectric transducer and an electrical level serving as a reference for judgement, position detecting means for generating an electrical signal when the article has reached an inspecting position, and a logic circuit for generating an electrical instructing signal in response to a judging output signal from the arithmetic circuit and an article detecting signal from the position detecting means. Thus, only when a defective article has reached the inspecting position, the apparatus produces an electrical instructing signal through the logic circuit to instruct a defective article selector that the defective article having, for instance, a flaw, blemish, irregular coating pattern or the like has reached the inspecting position and to operate the selector accurately in response to the instruction.

Other objects and features of this invention will become more apparent from the following description of embodiments of this invention.

BRIEF DESCRIPTION OF THE DRAWINGS

FIGS. 12 (a) and (b) show examples of means for indicating the brightness of the light source and means for warning that the light source has become too dark;

FIGS. 14 (a) and (b) are diagrams showing the difference between the output waveshapes produced from the photoelectric transducer with the use of a detecting pattern divided into several segments and with the use of an undivided pattern respectively.

DESCRIPTION OF THE PREFERRED EMBODIMENT

Figure 1:
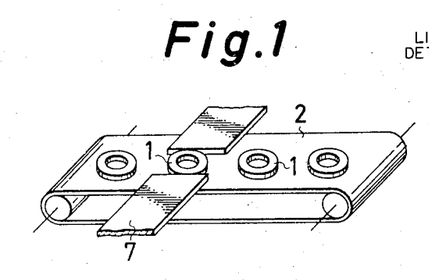
FIG. 1 is a schematic view showing an example of a conveyor for transporting articles to be inspected used in this invention.
Figure 2:
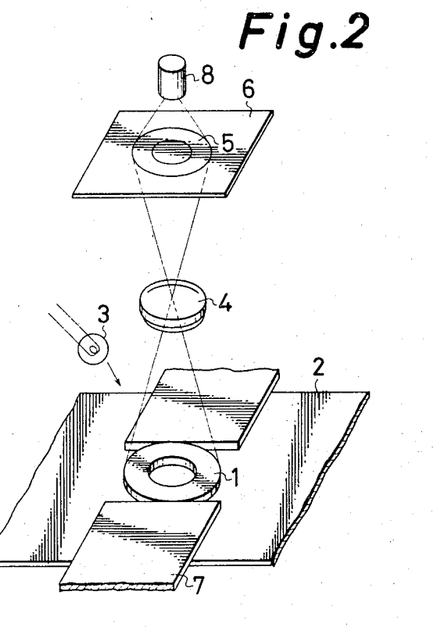
FIG. 2 is a schematic view showing the embodiment of pattern detector of this invention.

With reference to FIGS. 1 and 2, articles 1 to be inspected are aligned on a conveyor such as a belt conveyor 2 at a given spacing and conveyed in a specified direction at a given speed. At an intermediate portion of path of travel of the articles 1, there is disposed a light source 3 for illuminating the articles from a fixed position. An image-forming optical system 4 is fixed in position by which the image of the article 1 is formed on an imaginary plane.

Disposed near the image-forming optical system 4 is a similar pattern 5 resembling the pattern of a portion of the article 1 to be detected and permitting the passage of the reflected light. The similar pattern 5 may be in the form of an image permitting the passage of the reflected light and formed on a film 6 as illustrated or in the form of a slit or penetrating hole identical to the image in shape.

The article 1 to be inspected is guided by a guide 7 while travelling on the belt conveyor 2, and the reflected light image thereof is brought into registry with the similar pattern 5 through the image-forming optical system 4.

Behind the similar pattern 5, there is disposed photoelectric transducer 8 such as photodiode for receiving the light passing through the pattern 5 to convert the light into a electrical signal in accordance with its intensity. If a photoelectric transducer is used which has a light receiving surface made identical to the similar pattern 5 in shape and disposed at the focusing plane of the image-forming optical system 4, the result obtained without using the similar pattern 5 will be the same as when the photoelectric transducer 8 receives the light passing through the similar pattern 5. The photoelectric transducer will then involve the function of the similar pattern 5 and there is no need to provide the similar pattern 5.

Figure 3:
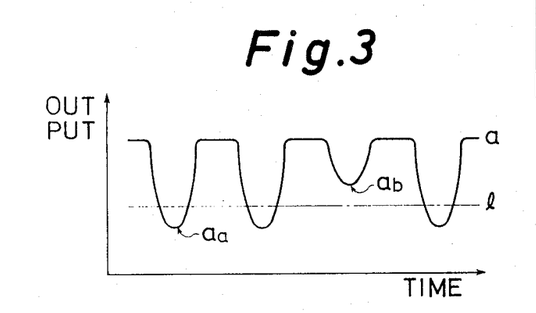
FIG. 3 is a diagram showing an example of waveshape of output from a photoelectric transducer included in the pattern detector.

FIG. 3 shows an example of electrical signal resulting from the variations in the intensity of light which strikes the photoelectric transducer 8 after passing through the similar pattern 5. According to FIG. 3, the output of the photoelectric transducer 8 is plotted as ordinate and time factor as abscissa in the case where the flawless or acceptable portion has the lowest reflectivity with the defective portion having higher reflectivity whereas the belt conveyor portion has the highest reflectivity. While receiving light reflected from the belt conveyor, the photoelectric transducer produces an output $a$, which progressively lowers as the article to be inspected approaches the inspecting position, and the output reaches the lowest value upon the light image of the article 1 coming into registry with the similar pattern 5. The output then rises as the article 1 moves out of the inspecting position.

When the light image of the article 1 is in registry with the similar pattern 5, the output at its lower limit is $a_a$ if the article is acceptable, or it is $a_b$ if the article is defective as illustrated in the drawing.

Accordingly, the output level $l$ for the determination of acceptability is usually set at an intermediate position between the output $a_a$ and the output $a_b$. Thus, outputs lower than the level $l$ indicate acceptability and those higher than $l$ show unacceptability.

If the acceptable portion has the highest reflectivity, the defective portion has lower reflectivity and the belt conveyor portion has the lowest reflectivity in the foregoing case, the resulting output curve will be exactly in inverted relation to the curve of FIG. 3. For the sake of convenience, however, the following description will be given with reference to the case which gives the output curve of FIG. 3.

An exemplary basic construction of the detector according to this invention has been described. The output signal of the photoelectric transducer 8 is fed to a signal processing circuit to be described below.

Figure 4:
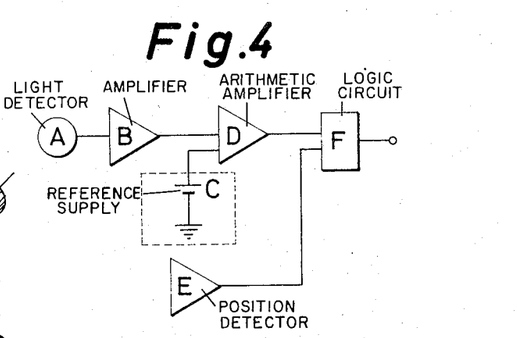
FIG. 4 is a block circuit diagram of a signal processing circuit according to this invention.

Referring to FIG. 4, the output from a light detecting circuit A including the photoelectric transducer 8 is amplified by a current voltage converter circuit B to give an input to an arithmetic amplifier or gauging circuit D. Another input terminal of the arithmetic amplifier D is connected to a reference power source C for setting a reference level $l$ for determining whether the article 1 is acceptable or not.

The arithmetic amplifier D calculates the difference between the reference level $l$ and the output from the current voltage converter circuit B and gives a logical circuit F a signal "1" if the output is higher than the reference level $l$ or a signal "0" if it is lower than the reference level.

Position detecting means E comprises for example an optical switch composed of a light source and a photocell in combination for detecting that the article 1 is positioned at the inspecting position. Alternatively, it may comprise a proximity switch utilizing the change in the electric capacity due to the approach of the article 1. It gives the logic circuit F a detecting signal "1" upon detecting that the article 1 is in the inspecting position and a detecting signal "0" when the article 1 is not so positioned.

Figure 5:
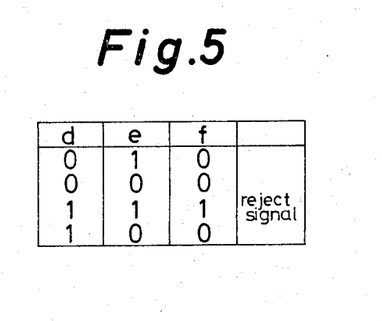
FIGS. 5 and 6 are diagrams for illustrating a signal processing system in a logical circuit.

As shown in FIG. 5, the logic circuit F is an AND circuit to be supplied with the output $d$ of the arithmetic amplifier D and the output $e$ of the position detecting means E and produces an instructing signal $f$ as an output. The output signal indicates that the article inspected is a reject, if it is "1."

When the photoelectric transducer 8 receives reflected light from an acceptable article, the output signal $d$ from the arithmetic amplifier D is "0," whereas if it receives reflected light from a defective article and the conveyor belt, the signal $d$ is "1" as already described. Further when the position detecting means E detects that the article 1 is in the inspecting position, the output signal $e$ is "1," but if the article is not so positioned, the output signal $e$ is "0." Consequently, only when both output signals $d$ and $e$ are "1," the instructing signal $f$ emitted from the AND circuit is "1," i.e. a reject signal. Otherwise, the circuit indicates that the article 1 at the inspection position is acceptable or that the article 1 is not located at the inspecting position. If the instructing signal $f$ is "1," the circuit therefore actuates a timer or the like to operate a selector as desired.

Figure 6:
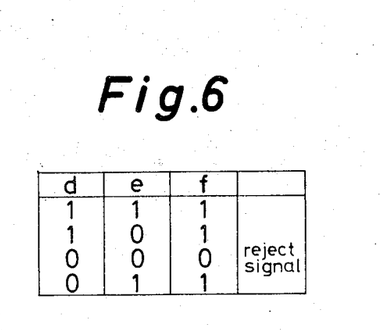

For reference, FIG. 6 shows a signal processing system in the case where the acceptable portion has the highest reflectivity, the defective portion has lower reflectivity and the conveyor belt has the lowest reflectivity. Only when the photoelectric transducer 8 produces an acceptability indicating output, the arithmetic amplifier D emits an output signal $d$ of "1" and otherwise a signal "0." When detecting that the article 1 to be inspected is located at the inspecting position, the position detecting means E produces an output signal $e$ of "0" and otherwise a signal "1." The logic circuit F, acting as an OR circuit produces an instructing signal $f$ of "0," i.e. a reject signal.

Although a specific example of the signal processing system has been described, the respective output signals may be so designed that, for example, a NAND circuit may substitute for the AND circuit or a NOR circuit may substitute the OR circuit. It will be apparent from the foregoing description that the intended objects of this invention can be fulfilled by changing over the position detecting means E or logic circuit F with a switch in accordance with the reflectivities of acceptable portion and defective portion. Such modifications are included within the scope of this invention.

In the case where the duration of the signal from the arithmetic amplifier D is shorter than that of the signal from the position detecting means E and both signals are not coexistent, the logic circuit F receiving the output signals $d$ and $e$ may possibly detect an acceptable article as a defective article because part of the output signal from the arithmetic amplifier D other than the acceptability indicating signal is a reject or like signal.

Figure 7:
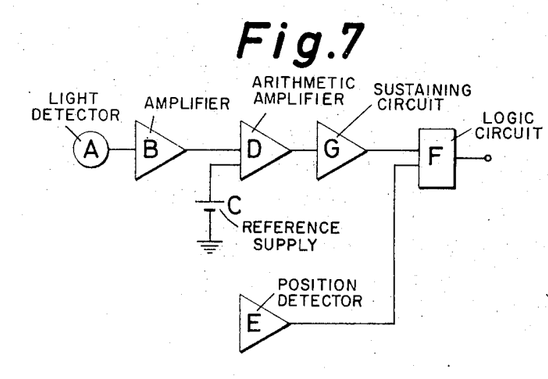
FIG. 7 is a block circuit diagram showing another embodiment of the signal processing circuit.

FIG. 7 shows an embodiment of signal processing circuit free of such objectionable possibility which incorporates a sustaining circuit G composed, for example, of a monostable multivibrator circuit which produces a rectangular output pulse as hereinafter described and illustrated in FIG. 8, graph (g).

Figure 8:
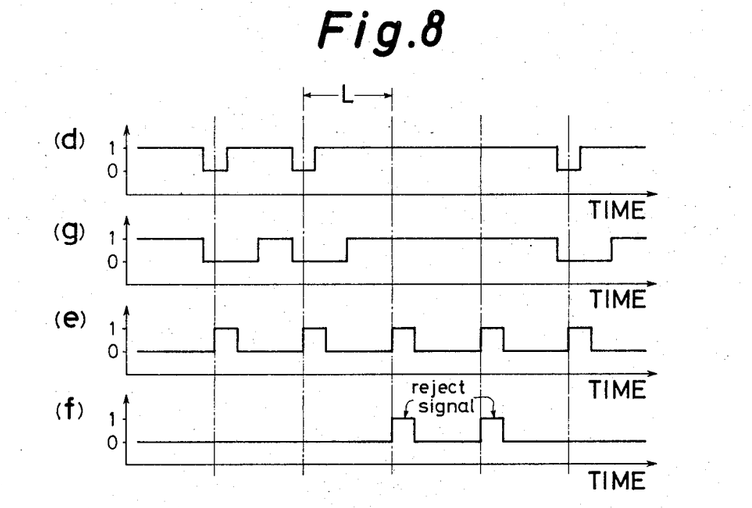
FIG. 8 is a diagram for illustrating the signal processing system in the signal processing circuit of FIG. 7.

Supposing that the output signal $d$ from the arithmetic amplifier D is "0" for acceptable articles and otherwise "1," he signal may be represented by the graph (d) of FIG. 8 in which L stands for the time interval at which the articles 1 reach the inspecting position. Since the output signal $e$ from the position detecting means E is "1" if the article 1 is located at the detecting position and is otherwise "0," the signal will be represented by the graph (e) of FIG. 8. Accordingly, unless acceptability indicating signal "0" and position detecting signal "1" are coexistent, the position detecting signal "1" will be coexistent with an output signal $d$ of "1," permitting the logic circuit F to produce a reject signal "1." As a result, an acceptable article will be detected as a reject.

When an output signal "0" is produced from the arithmetic amplifier circuit D, the sustaining circuit G serves to maintain the signal "0" for a period of time within the range of the time interval L, the duration being such that the "0" signal will not overlap a subsequent "0" signal, as represented by the graph (g) of FIG. 8. Consequently, even if the position detecting signal $e$ is generated with some delay, the logic circuit F continues to produce an output signal of "0" as seen in FIG. 8 (f), if the article 1 at the inspecting position is acceptable, while it gives an output signal "1," i.e. a reject signal, only when detecting a defective article.

Figure 10:
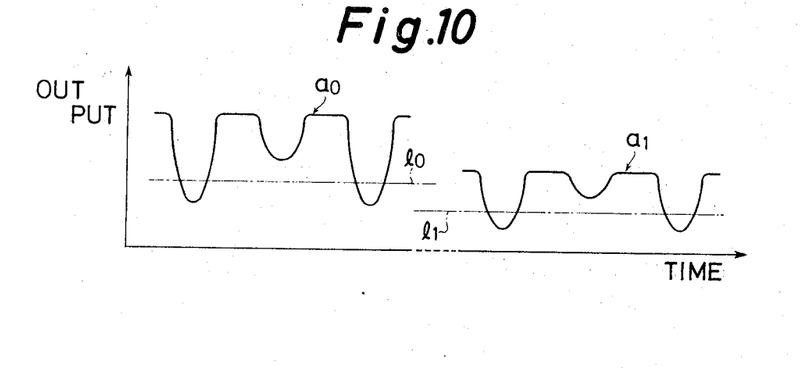
FIG. 10 is a diagram of waveshapes showing a variation in the output of the photoelectric transducer relative to the brightness of the power source in FIG. 9.

If a natural light source is used as an illuminating light source 3 or the power for the light source 3 is supplied by a battery or the like, the brightness of the light source may change or lower with the lapse of time, with the result that the output of the photoelectric transducer 8 will vary with the brightness of the light source. For instance, in the case where an initial output level is at $a_0$, with the reference level set at $l_0$ as illustrated in FIG. 10, the output level of the photoelectric transducer 8 reduces to $a_1$ as the brightness of the illumination lowers with the lapse of time. If the reference level is still set at $l_0$ in spite of the reduction of the output level of the transducer 8, there arises the possibility of the arithmetic circuit D producing an output signal $d$ of "0" even in response to reflected light from a defective portion.

To meet such situation, the present invention provides means as illustrated in FIGS. 9 to 12.

Figure 9:
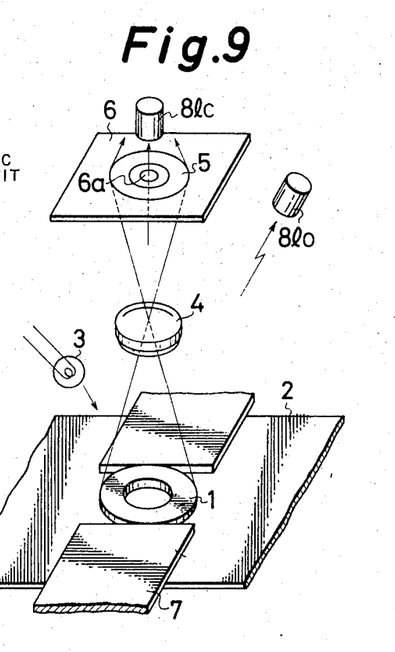
FIG. 9 is a schematic diagram showing an embodiment of the pattern detector in which the reference level for judgment can be adjusted automatically in accordance with the brightness of the power source.

FIG. 9 shows an embodiment incorporating a photoelectric transducer $8l$ for setting a reference level in place of the reference power source C. As seen in FIG. 9, the transducer $8l$ is positioned at $8lc$ behind a film 6 formed with a similar pattern 5 and a center hole $6a$ so as to detect the intensity of light from the light source 3. Alternatively, the transducer may be disposed at a desired position, for example at $8lo$ outside the similar pattern 5.

Figure 11:
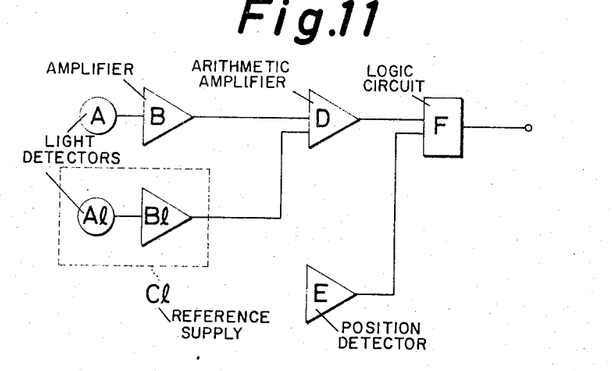
FIG. 11 is a block circuit diagram showing an example of signal processing circuit for the embodiment of FIG. 9.

FIG. 11 shows a reference level setting circuit $Cl$ which comprises in combination a detecting circuit $Al$ including the photoelectric transducer $8l$ for setting the reference level, and a current voltage converter circuit $Bl$. The circuit $Cl$ is so designed that its output corresponds to the brightness of the light source 3 to render the reference level shiftable from $l_0$ to $l_1$ in corresponding relation to the brightness of the light source as seen in FIG. 10. This eliminates the objectionable operation of detecting a defective portion as an acceptable article as experienced with fixed reference level $l$ when the brightness of the light source reduces.

Figure 12:
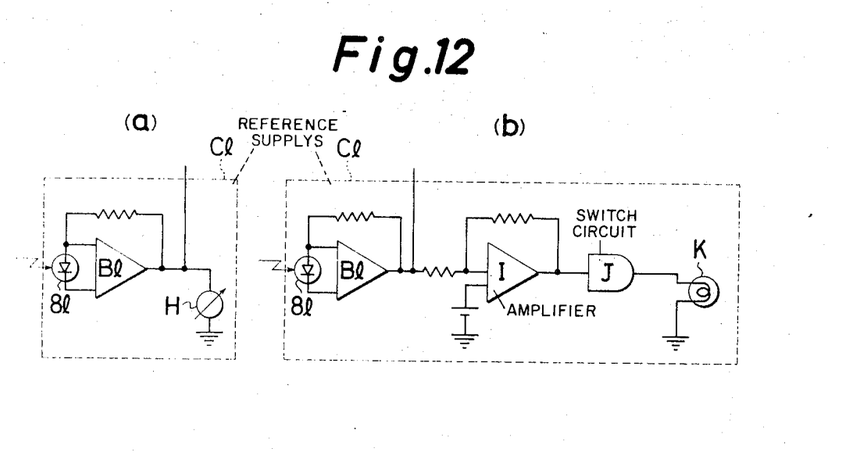

However, if the brightness of the light source reduces to a very low level, the difference between the intensity of reflected light from the acceptable portion and that of reflected light from the defective portion will be very small, making it impossible to conduct detecting operation. To meet such situation, it is advantageous to incorporate a meter H for indicating the brightness of the light source 3 into the reference level setting circuit C$l$ as illustrated in FIG. 12 (a) so that the light source 3 or the battery therefor can be replaced when the brightness has reduced to a specified level. Another advantageous construction is shown in FIG. 12 (b) in which the setting circuit C$l$ includes an amplifier circuit I and a switching circuit J in combination with a lamp K or unillustrated buzzer which gives a warming to the need for replacement of the light source 3. Such construction may further include an unillustrated relay for stopping the operation of the apparatus.

Figures 13, 14:
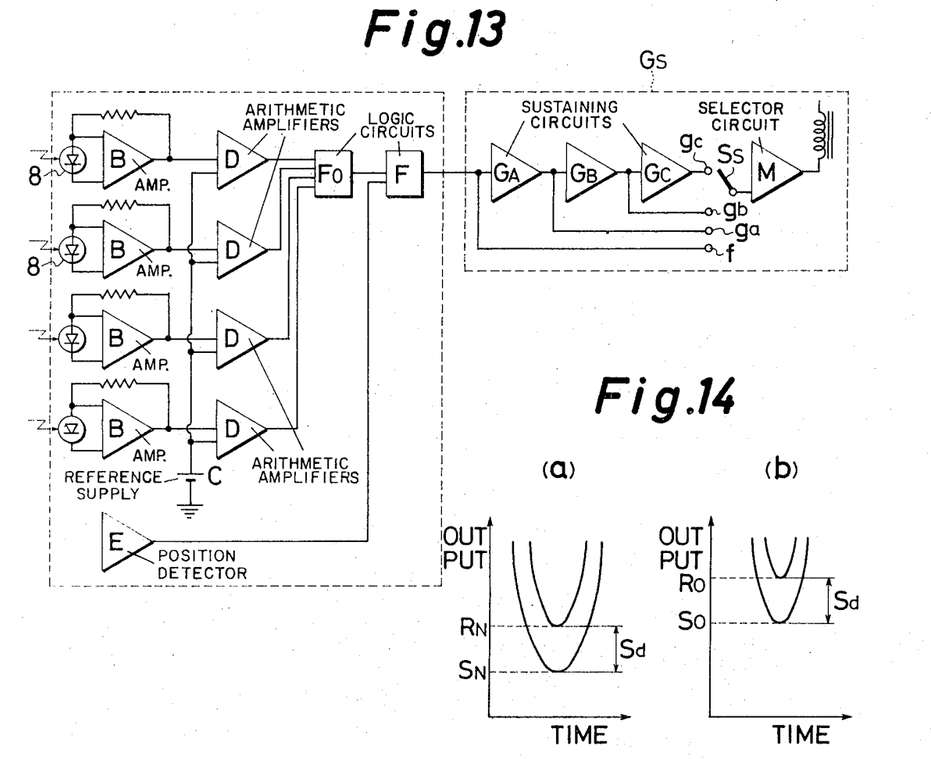
FIG. 13 is a block circuit diagram showing an example of a circuit including a signal processing circuit for use with a detecting pattern divided into several segments and means for transmitting signals to a selector.

FIG. 13 is a block diagram of an embodiment in which the similar pattern 5 divided into N segments is used to permit the same number of photoelectric transducers 8 to receive light passing through the divided segments so as to assure improved detecting accuracy. More specifically, the outputs from photoelectric transducers 8 disposed for the N divided segments of a similar pattern (not shown) are individually applied through circuit voltage converter circuits B to arithmetic amplifiers D, in which the inputs are compared with the input from a reference voltage source C connected to the amplifiers so as to judge the acceptability of the article from segment to segment. The outputs from the arithmetic amplifiers D are fed to first logic circuit $F_0$. When one or a plurality of the arithmetic amplifiers D produce judging output signals other than acceptability indicating signal, the logic circuit $F_0$ emits an output signal other than acceptability indicating signal, whereupon a signal indicating whether the inspected article is acceptable or not is generated from an acceptability judging logical circuit F which is given a signal output from position detecting means E.

Supposing that part of an article has a blemish (defective portion) which is covered by one of the plurality of segments of the aforementioned pattern, with flawless part covered by the other segments. In the following description, it is further assumed that the blemish has higher reflectivity than the acceptable portion.

In the case where N transducers disposed for N segments of the pattern respectively receive reflected light from a flawless acceptable article through the pattern, the acceptability indicating output $S_N$ of each of the transducers is 1/N the acceptability indicating output $S_0$ of one photoelectric transducer which receives the same reflected light through one undivided similar pattern as shown in FIGS. 14 (a) and (b).

As already assumed, the defective portion has higher reflectivity than the acceptable portion, while the area of the defective portion remains the same irrespective of whether the entire article is divided into a plurality of segments. Since the defective portion is covered by one of the plurality of segments of the similar pattern, the photoelectric transducer which receives reflected light through the segment covering the defective portion produces an output $R_N$ which is the sum of the output $S_N$ obtained in response to reflected light through the segment which does not cover the defective portion and an output increment $Sd$ due to the presence of the defective portion. On the other hand, if the reflected light from the article is received by one photoelectric transducer through one undivided similar pattern, the corresponding output is $R_0$ which is the sum of the acceptability indicating output $S_0$ and the output increment $Sd$ due to the presence of the defective portion. For a better understanding, the waveshape of acceptability indicating output and the waveshape of unacceptability indicating output from the photoelectric transducer are superposed one on the other at the same position both in FIG. 14 (a) showing the case in which the divided pattern is used and in FIG. 14 (b) showing the case in which the undivided pattern is used.

If the article inspected has one blemish, the intensity of reflected light from the blemish does not vary depending on the number of the divided segments of the similar pattern. Accordingly, the difference $Sd$ in the output of the photoelectric transducer between the case in which the blemish is detected and the case in which it is not detected is the same for the case of FIG. 14 (a) in which detection is conducted by one photoelectric transducer in combination with the divided segment and for the case of FIG. 14 (b) in which the undivided pattern is used. In terms of the output level of the photoelectric transducer, however, the acceptability detecting output $S_N$ of one photoelectric transducer used in combination with one of the N segments is 1/N the acceptability indicating output $S_0$ of the photoelectric transducer in the undivided case, the output $S_N$ thus reducing in proportion to the number N of the segments, whereas the unacceptability indicating output $R_N$ in the former case is greater than 1/N the like output in the latter case. As a result, the arithmetic amplifier D can detect with greater distinctness the variation in the unacceptability indicating output $R_N$ due to the division, with respect to the acceptability judging level provided by the output from the reference power source C, thus assuring improved accuracy in detection.

Generally, blemishes are not always located concentrically at one portion of the article to be inspected. For instance, blemishes may possibly be so located as to uniformly give each of the N divided segments reflected light having 1/N the intensity of the foregoing reflected light from the blemish. This is the most disadvantageous situation to be encountered with the embodiment of FIG. 13, in which case the ratio between the acceptability indicating outputs $S_N/S_0$ reduces to 1/N, with the ratio between the unacceptability indicating outputs $R_N/R_0$ likewise reducing to 1/N. However, this is simply a proportional reduction of the acceptability indicating output and unacceptability indicating output, as compared with the case in which reflected light passing through one undivided similar pattern is received by one photoelectric transducer for the judgment of acceptability, so that the detecting ability of each photoelectric transducer receiving reflected light through each segment is equivalent to that of the photoelectric transducer which receives reflected light through the entire area of one similar pattern. Briefly, the detecting ability will not become lower than when one photoelectric transducer is used for the entire similar pattern.

The embodiment shown in FIG. 13 further includes a sustaining circuit $G_S$ for controlling the operation timing of a selector M.

Generally, it is very difficult to check up articles at an inspecting position while the articles are being transported on a belt conveyor and to immediately and directly separate out defective articles from among the inspected articles, because of the insufficient space available for the provision of a selector. Accordingly, it is customary to provide means for memorizing for some time the defective articles detected as such at the inspecting position and to remove them from the path of travel by the selector when they have been transported from the inspecting position to a predetermined position.

The sustaining circuit $G_S$ shown in FIG. 13 includes three sustaining circuits $G_A$, $G_B$ and $G_C$ connected in series. To vary the sustaining time as desired, there are provided contacts $f$, $g_a$ and $g_b$ for bypassing the sustaining circuit $G_A$, $G_B$ and $G_C$ respectively, and a contact $g_c$ extending from the terminal sustaining circuit $G_C$. These contacts are selectively connected to the selector M by means of a changeover switch Ss to actuate the selector M with selected timing.

Suppose that the sustaining time for each of the sustaining circuits $G_A$, $G_B$ and $G_C$ is set at three-fourths the time interval L of the travel of the articles to be inspected.

Figure 15:
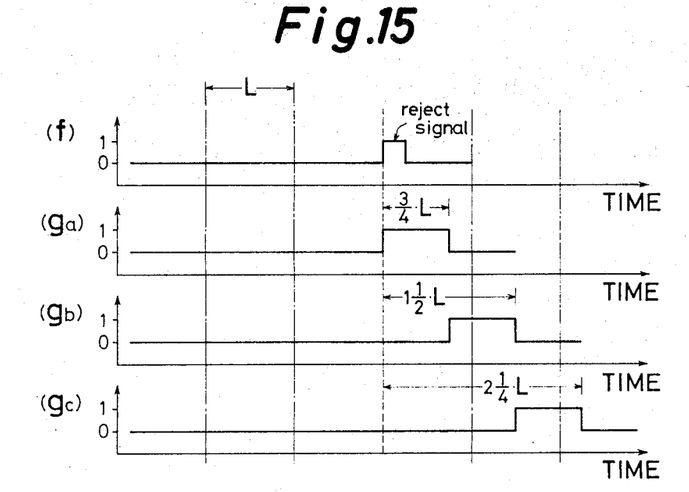
FIG. 15 is a diagram showing a mode of processing the operating signal for the selector in the circuit of FIG. 13.

When the changeover switch Ss is connected to the contact f, a reject signal from the logical circuit F shown in FIG. 15 (f) is directly delivered to the selector M by way of the contact f. In other words, the selector M is operated simultaneously with the operation of the logic circuit F (i.e., the detection of a defective article).

If the changeover switch Ss is connected to the contact $g_a$, a signal shown in FIG. 15 ($g_a$) from the logic circuit F is delivered to the selector M through the sustaining circuit $G_A$. Thus, the selector M operates about ¾ L after the emission of a reject signal.

Likewise, the changeover switch Ss, when connected to the contact $g_b$, causes the selector M to operate with a time delay of 1½ L as shown in FIG. 15 ($g_b$). If the switch is connected to the contact $g_c$, the selector operates with a time delay of 2¼ L as shown in FIG. 15 ($g_c$).

Although the foregoing description has been given with respect to the detection of defective articles only, it will be apparent from the description that acceptable articles can be detected by an altered mode of the signal processing system, which is of course included within the scope of this invention. The light source may be indoor or outdoor natural light.

What is claimed is:

1. A pattern detecting apparatus comprising the combination of:
    a conveyor for continuously transporting articles to be inspected through an inspecting position,
    an image-forming optical system for projecting a reflected light image from an article at said inspecting position onto a predetermined image plane to form an image thereon,
    a reference pattern disposed in proximity to said image plane and permitting the passage of the reflected light image through that area of the reference pattern which is the same as the pattern of a portion of the article to be detected, the reference pattern resembling the pattern of at least a portion of the article to be detected,
    a light detecting means including a photoelectric transducer disposed to receive light passing through the reference pattern only for producing a light detecting signal,
    reference setting means for producing an electrical reference level serving as a reference for, gauging said light detecting signal,
    circuit means for producing a gauging signal responsive to the difference between the said light detecting signal and the electrical reference level,
    position detecting means for generating an electrical position detecting signal in response to the presence of an article at said inspecting position, and
    a logic circuit for generating an electrical information signal in response to said gauging signal and an article position detecting signal.

2. The apparatus as set forth in claim 1 including sustaining circuit means interposed between the gauging circuit means and the logic circuit for maintaining among output signals from the gauging circuit means an output signal involving a factor to be excluded by inspection for a given period of time before a detecting signal for the subsequent article to be inspected is emitted.

3. The apparatus as set forth in claim 1 wherein the reference setting means comprises a reference power source connected to one of the input terminals of the gauging circuit means to provide a predetermined electrical potential.

4. The apparatus as set forth in claim 3 wherein the reference setting means comprises reference level setting means whose output is variable in response to the brightness of the light illuminating the article and is applied to one of the input terminals of the gauging circuit after amplification.

5. The apparatus as set forth in claim 4 wherein the reference level setting means comprises a detecting circuit and a current voltage converter circuit for amplifying the output of the detecting circuit, the detecting circuit including a photoelectric transducer for receiving at the inspecting position the reflected light whose intensity varies with the variation in the brightness of the illuminating light source.

6. The apparatus as set forth in claim 1 wherein the reference pattern comprises the combination of divided segments for passing a plurality of fractions of reflected light from a pattern of portion of the article being inspected, a plurality of said light detecting means including said photoelectric transducers are provided for the similar pattern with one photoelectric transducer disposed for each segment thereof so as to receive the light passing through the segments individually, and the same number of the gauging circuits as the divided segments are provided so as to individually calculate the difference between the reference signal level and the output signal of each light detecting means including each of the photoelectric transducers.

7. The apparatus as set forth in claim 1 which further includes a sustaining circuit for maintaining an information output signal from the logic circuit for a specified period of time, the sustaining circuit being operable to actuate a selector for selecting articles to be removed from the path of the conveyor, a specified time after emission of the instructing signal from the logic circuit.

8. The apparatus as set forth in claim 1 wherein said logic circuit comprises circuit means for generating the information signal when supplied with both the article detecting signal from the position detecting means and an output signal from the gauging circuit responsive to the presence of a higher electrical level of the output signal from the photoelectric transducer as compared with the electrical level of the reference signal.

9. The apparatus as set forth in claim 8 wherein said logic circuit comprises an AND circuit.

10. The apparatus as set forth in claim 8 wherein said logic circuit comprises a NAND circuit.

11. The apparatus as set forth in claim 1 wherein the logic circuit comprises a circuit which generates the information signal when supplied with both the position detecting signal and the output signal from the gauging circuit indicating the presence of the lower electrical output level of the photoelectric transducer as compared with the electrical level of the reference signal.

12. The apparatus as set forth in claim 11 wherein said logic circuit comprises an OR circuit.

13. The apparatus as set forth in claim 11 wherein said logic circuit comprises a NOR circuit.

* * * * *